July 29, 1969   S. V. DILLON   3,457,823
PROTECTIVE BOLT AND NUT ASSEMBLIES
Filed Sept. 23, 1966

INVENTOR
STEPHEN V. DILLON
BY Cohn and Powell
ATTORNEYS

United States Patent Office 3,457,823
Patented July 29, 1969

3,457,823
PROTECTIVE BOLT AND NUT ASSEMBLIES
Stephen V. Dillon, 2256 S. Troost, Tulsa, Okla. 74106
Filed Sept. 23, 1966, Ser. No. 581,648
Int. Cl. F16b 35/00, 27/00, 29/00
U.S. Cl. 85—1                                    8 Claims

ABSTRACT OF THE DISCLOSURE

The protective bolt and nut assembly includes a bolt having a head and a threaded shank, the shank receiving a nut. The protective means is provided by a unitary resilient cover which extends from end to end of the bolted assembly and provides the assembly with an insulated cover in the installed condition. The cover is provided by an elongate tube of substantially constant diameter stretched as necessary to conform to the configuration of the bolt head and nut.

---

This invention relates generally to improvements in protective bolt and nut assemblies, and more particularly to assemblies of this type which reduce shock and vibration imparted to the fastener elements from the interconnected structural members, and which preclude corrosion of and between the fastener elements.

Fatigue in fastener elements is caused by shock and vibration imparted to the fastener elements by the structural members interconnected, and can result in failure of the fastener element. The present solution for this problem is to capsulate the fastener elements in a rubber or rubber-like material which will take up shock and vibration imparted thereto from the structural members, and hence the fastener elements will not be subjected to fatigue to the same extent as the conventional fasteners without such insulating cover. Another purpose for the cover is that it prevents corrosion of the fastener element.

An important objective is achieved by the provision of a protective bolt and nut assembly in which a resilient, insulating cover is disposed over the bolt and the nut when operatively assembled, such cover realizing the above-mentioned functional result and advantages.

Another important object is afforded by the structural arrangement in which the resilient insulating cover includes an elongate tube having a cross-sectional dimension approximating that of the bolt shank so that the tube extends over and about the shank, the bolt head and the nut. The tube is closed at both ends.

Yet another important objective is attained in the structural arrangement in which the resilient, insulating cover includes an elongate tube having a closed end and an open end. The closed end of the tube embraces the bolt head, while the tube extends over and about the bolt shank and nut. A closure means selectively closes the open end of the tube over and about the nut and the shank end.

An important objective is provided in that the closure means includes an insulating plug selectively disposed in the open tube end. Of further advantage, the open tube end includes an internal peripheral groove outwardly of the shank end, which selectively receives the insulating plug outwardly of the nut, the plug being resiliently retained by the open tube end to provide an effective seal.

Another important objective is realized in that the closure means includes a clip selectively pinching and closing the open tube end about the shank end and nut. Instead of an integral closed tube end embracing the bolt head, a clip may be utilized to pinch and close this so-called closed tube end. It is convenient to provide means that selectively interconnects the clips when one or both are operatively disconnected from the respective tube ends to preclude loss of the clips and to provide sufficient clips ready for assembly.

A further important objective is achieved by the structural arrangement in which the resilient, insulating cover includes a coating over and on the entire bolt, and a coating over and on the entire nut so that there is only a coating-to-coating contact between the bolt and nut when assembled.

An important objective is to afford a protective bolt and nut assembly that is simple and durable in construction, economical to manufacture and assemble, highly efficient in operation, and which can be readily installed by anyone with little or no instruction.

The foregoing and numerous other objects and advantages of the invention will more clearly appear from the following detailed description of several embodiments, particularly when considered in connection with the accompanying drawing, in which.

Figure 1:
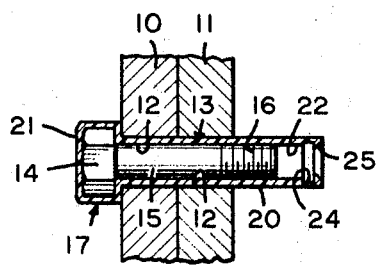
FIG. 1 is a cross-sectional view of one embodiment of the protective bolt and nut assembly, with the bolt and cover inserted through the structural members.
Figure 2:
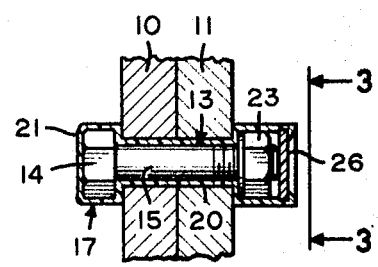
FIG. 2 is a cross-sectional view similar to FIG. 1, but showing the nut and closure plug applied.
Figure 3:
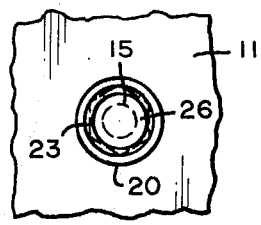
FIG. 3 is a fragmentary end view taken along line 3—3 of FIG. 2.
Figure 4:
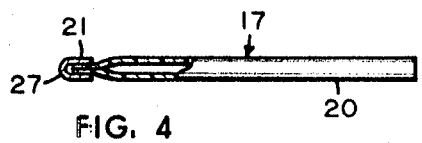
FIG. 4 is a side elevational view, partly in cross-section, of a resilient, insulating cover for another embodiment of the protective bolt and nut assembly.
Figure 5:
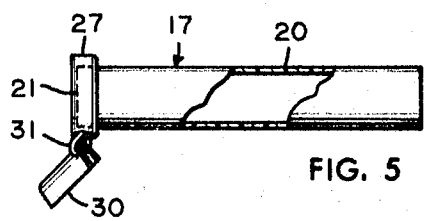
FIG. 5 is a top plan view, partly in cross-section, of the cover illustarted in FIG. 4.

Referring now by characters of reference to the drawing, and first to the species illustrated in FIGS. 1–3, the bolt and nut assembly includes a pair of structural members 10 and 11 to be fastened together in contiguous abutment. A pair of aligned holes 12 are provided through the structural members 10 and 11.

A bolt generally indicated by 13 includes a bolt head 14 and an integral, elongate shank 15. The bolt shank is provided with threads 16.

Disposed over the bolt 13 is a resilient, insulating cover generally referred to by 17 and consisting of rubber or rubber-like material. In this embodiment, the insulating cover 17 consists of an elongate tube 20 having a closed end 21 and an open end 22. The bolt 13 is installed in the insulating cover 17 by inserting the bolt 13 through the open tube end 22 so that the bolt head 14 is embraced and enclosed by the closed tube end 21.

As is best illustrated in FIG. 2, the open tube end 22 can be folded back so as to enable a nut 23 to be threadedly attached to the bolt shank 15. Then, the open tube end 22 is extended so as to embrace the sides of the nut 23. The elongate tube 20 has a cross-sectional dimension approximating that of the bolt shank so that the tube 20 extends over and resiliently grips the bolt shank 15, the bolt head 14 and the nut 23.

Formed internally of the tube 20 outwardly from the end of bolt shank 15 and outwardly of nut 23 is a peripheral groove 24, partially defined by a peripheral end lip 25. Selectively disposed and retained in the peripheral groove 24 is a flat plug 26 constituting a closure means.

The lip 25 and the resiliency of the tube 20 hold the plug 26 in place. The plug 26, together with the tube 20, forms an effective seal that fully protects the bolt 13 and nut 23.

To use the bolt and nut assembly of FIGS. 1–3 inclusive, the structural members 10 and 11, to be connected, are placed in face-to-face relation with the holes 12 aligned. The bolt 13 is inserted into the insulating cover 17 so that the closed tube end 21 closely embraces the bolt head 14. Then, the bolt shank 15, with its resilient overlying tube 20, is inserted through the aligned holes 12, as is illustrated in FIG. 1. The nut 23 is inserted into the open end 22 of the tube 20 and is threaded on the bolt shank 15 to secure the structural members 10 and 11. When fully tightened, the plug 26 is inserted into the peripheral groove 24 to seal the unit. Any shock or vibration imparted to the structural members 10 and 11 will be at least partially absorbed by the insulating cover 17, and hence will not be imparted to the bolt 13. Accordingly, the possibility of bolt failure because of fatigue is minimized.

The species of the bolt and nut assembly shown in FIGS. 4–8 inclusive is similar to that previously described with respect to FIGS. 1–3 inclusive, and accordingly, corresponding reference numerals will be utilized wherever possible. For example, in FIG. 7, the structural members 10 and 11 to be connected are arranged in face-to-face contiguous relation with transverse bolt holes 12 aligned. The bolt 13 and its cooperative nut 23 have the same construction, and the component parts will be referred to by identical reference numerals.

The resilient, insulating cover 17 consists of an elongate, substantially flat tube 20 having a closed end 21 and an open end 22.

Closing the tube end 21 is a substantially U-shaped clip 27 constituting a clamp. Preferably carried by the clip 27 is a similar substantially U-shaped clip 30 that is adapted to close the other tube end 22 selectively, the clip 30 constituting a closure means. A detachable ring 31 is utilized to interconnect the clips 27 and 30.

The cross-sectional dimension of the resilient tube 20 closely approximates the cross-section of the bolt shank 15 so that the tube 20 resiliently grips the shank 15 when the bolt 13 is inserted. Upon insertion of the bolt 13 into the tube 20, the bolt head 14 is moved close to the clip 27 so that the closed tube end resiliently grips and embraces the bolt head 14. To install the nut 23, the open tube end 22 is turned back so that the nut 23 can be threadedly applied to the bolt shank 15. After connection of the nut 23, the tube end 22 is extended over the nut 23 so that the tube 20 resiliently embraces the nut 23. The bolt 13 and nut 23 are sealed within the tube 20 by detaching the coacting clip 30 from ring 31 and by clamping such clip 30 over the tube end 22 outwardly of the bolt shank 15 and outwardly of the nut 23.

Figure 6:
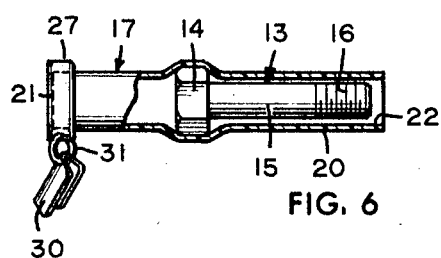
FIG. 6 is a top plan view, partly in cross-section, of the cover shown in FIGS. 4 and 5 with the bolt partially inserted.

To use the bolt and nut assembly disclosed in FIGS. 4–8 inclusive, the structural members 10 and 11 are arranged in face-to-face relation with the holes 12 transversely aligned. The bolt 13 is inserted into the insulating cover 17, as is shown in FIG. 6, until the bolt head 14 is located adjacent the closure clip 27.

Figure 7:
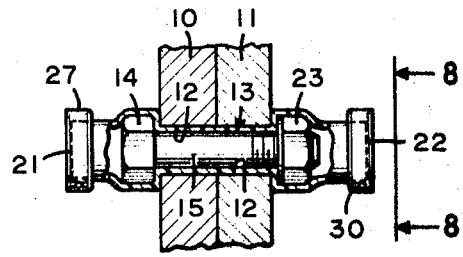
FIG. 7 is a cross-sectional view showing a completed bolt and nut assembly utilizing the component parts shown in FIGS. 4–6 inclusive.

Then, the bolt shank 15, together with its surrounding tube 20, is inserted into and through the aligned holes 12, as is shown in FIG. 7. The nut 23 is installed onto the bolt shank 15 and the closure clip 30 is affixed to the tube end 22, as previously described. The insulating cover 17, together with the pair of closure clips 27 and 30 provide an effective seal for both the bolt 13 and nut 23. It will be understood that any shock or vibration imparted to the structural members 10 and 11 will be at least partially absorbed by the resilient insulating cover 17. The possibility of bolt failure because of fatigue is minimized.

Figure 9:
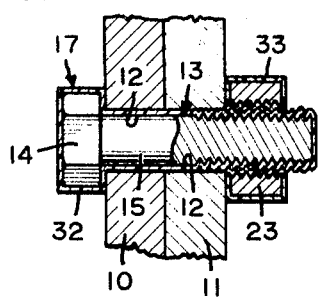
FIG. 9 is a cross-sectional view of still another embodiment of the protective bolt and nut assembly.
Figure 8:
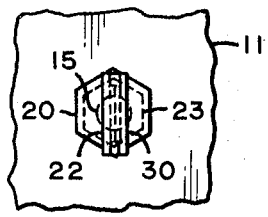
FIG. 8 is an end view taken along line 8—8 of FIG. 7.

FIG. 9 illustrates still another species of the bolt and nut assembly. Again, several of the component parts of this assembly are identical to those of the prior embodiments. and consequently, for the sake of clarity, corresponding reference numerals will be used wherever possible. For example, the structural members 10 and 11 are arranged in face-to-face relation with transverse holes 12 aligned. The bolt 13 and the nut 23 have the same general construction.

The resilient insulating cover in the species of FIG. 9 consists of a coating 32 molded on and over the bolt 13, and a coating 33 molded over and on the nut 23. The resilient coatings 32 and 33 cover the internal threads of nut 23 and the external threads 16 of bolt 13. The coatings 32 and 33 can be of any rubber or rubber-like material. The nut threads are sufficiently larger than the bolt threads to allow for the coatings and to enable the nut 23 to fit tightly on the bolt shank 15. Because the bolt 13 and the nut 23 are covered completely with the coatings 32 and 33 respectively, there is only a coating-to-coating contact when the nut is connected, which provides an effective seal for both parts and prevents corrosion between such parts.

To utilize the bolt and nut assembly of FIG. 9, the structural members 10 and 11 are arranged in face-to-face relation with the holes 12 transversely aligned. The bolt 13 having its resilient, insulating coating 32, is inserted through the aligned holes 12, and the nut 23, with its resilient, insulating coating 33, is tightened onto the bolt shank 15. Any shock or vibration imparted to the structural members 10 and 11 will be at least partially absorbed by the coatings 32 and 33, constituting the resilient, insulating covering. The possibility of bolt failure because of fatigue is thereby minimized.

Although the invention has been described by making detailed reference to several embodiments, such detail is to be understood in an instructive, rather than in any restrictive sense, many variants being possible within the scope of the disclosure.

I claim as my invention:

1. A protective bolt and nut assembly:
   (a) a bolt having a head and having a shank provided with threads,
   (b) a nut threadedly connected to the shank threads,
   (c) a unitary resilient, insulating cover over the bolt and nut, the cover being of rubber-like material and extending susbtantially from end to end of the bolt in the installed condition,
   (d) the resilient, insulating cover includes an elongate tube having a cross sectional dimension approximating that of the bolt shank so that the tube extends over and about the shank, and stretches laterally over the bolt head and nut, and
   (e) the tube is closed at both ends in the installed condition.

2. A protective bolt and nut assembly:
   (a) a bolt having a head and having a shank provided with threads,
   (b) a nut threadedly connected to the shank threads,
   (c) a unitary, resilient, insulating cover over the bolt and nut, the cover being of rubber-like material and extending substantially from end to end of the bolt in the installed condition,
   (d) the resilient, insulating cover includes an elongate tube having a closed end and an open end, the closed end of the tube embraces the bolt head, while the tube extends over and about the bolt shank and nut in substantial conformance to the configuration of the bolt head and nut and shank therebetween, and
   (e) closure means selectively closes the open end of the tube over and about the nut and the end of the shank in the installed condition.

3. A protective bolt and nut assembly as defined in claim 2, in which:
   (f) the open end of the tube extends beyond the shank end to provide a chamber for the nut applied to the shank, and
   (g) the closure means closes the open tube end beyond the shank end and the nut.

4. A protective bolt and nut assembly as defined in claim 2, in which:
   (f) the closure means includes a flat insulating plug of substantially the same diameter as the nut and selectively disposed in the open tube end.

5. A protective bolt and nut assembly as defined in claim 2, in which:
   (f) the closure means includes a clip selectively pinching and closing the open tube end about the shank end and nut.

6. A protective bolt and nut assembly as defined in claim 2, in which:
   (f) a clip pinches and closes the said closed end of the tube, and
   (g) the said closure means includes a clip selectively pinching and closing the open tube end about the shank end and nut.

7. A protective bolt and nut assembly as defined in claim 6, in which:
   (h) means selectively interconnects the clips when one or both are operatively disconnected from the respective tube ends.

8. A protective bolt and nut assembly:
   (a) a bolt having a head and having a shank provided with threads,
   (b) a nut threadedly connected to the shank threads, and
   (c) a resilient, insulating cover over the bolt and nut,
   (d) the resilient, insulating cover including an elongate tube of rubber-like material having a cross-sectional dimension approximating that of the bolt shank and the tube, and having a closed end and an open end, the closed end of the tube embracing the bolt head, while the tube extends over and about the bolt shank and nut,
   (e) closure means selectively closing the open end of the tube over and about the nut and the end of the shank,
   (f) the open tube end including an internal peripheral groove outwardly of the shank end, and
   (g) the closure means including an insulating plug selectively disposed in the groove outwardly of the nut and resiliently retained by the open tube end to provide an effective seal.

References Cited

UNITED STATES PATENTS

| | | |
|---|---|---|
| 1,027,782 | 5/1912 | Watrous. |
| 2,823,724 | 2/1958 | Gill. |
| 1,951,744 | 3/1934 | Waker. |
| 1,988,926 | 1/1935 | Thompson _____ 85—1 |
| 2,326,455 | 8/1943 | Gray. |
| 2,844,363 | 7/1958 | Clark. |
| 3,042,796 | 7/1962 | De Forest |

FOREIGN PATENTS

| | | |
|---|---|---|
| 459,202 | 4/1928 | Germany. |
| 747,560 | 4/1956 | Great Britain. |
| 690,770 | 4/1953 | Great Britain. |

EDWARD C. ALLEN, Primary Examiner